(12) United States Patent
Darr (10) Patent No.: US 6,928,913 B2
(45) Date of Patent: Aug. 16, 2005

(54) METHOD AND APPARATUS FOR TRIMMING CONTAINERS

(75) Inventor: Richard C. Darr, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 10/671,394

(22) Filed: Sep. 25, 2003

(65) Prior Publication Data

US 2005/0066783 A1 Mar. 31, 2005

(51) Int. Cl.[7] .............................. B26D 7/00; B23D 37/00
(52) U.S. Cl. .................... 83/410.9; 83/411.1; 83/411.7; 83/914; 83/923; 82/53
(58) Field of Search ............................ 82/101, 102, 48, 82/52, 53, 59, 47, 85, 60; 83/54, 914, 410.9, 411.1, 411.5, 923, 409, 411.3, 411.7, 663, 411; 425/305.1, 392, 394, 403.1, 806, 302.1; 215/380, 382; 264/536; 29/564.8, 566.1, 536, 426

(56) References Cited

U.S. PATENT DOCUMENTS

| 1,806,475 | A | * | 5/1931 | Lee ................................ 29/2.1 |
| 2,940,229 | A | * | 6/1960 | Baker ........................... 53/492 |
| 3,653,285 | A | * | 4/1972 | Yoshikawa et al. ........... 82/101 |
| 3,682,026 | A | * | 8/1972 | Criss et al. ..................... 82/75 |
| 3,818,785 | A | * | 6/1974 | Wakabayashi ............... 82/101 |
| 3,924,315 | A | * | 12/1975 | Cady et al. .................... 29/562 |
| 4,614,018 | A | * | 9/1986 | Krall ........................... 29/33 J |
| 5,201,788 | A | * | 4/1993 | Le Naour ..................... 53/468 |
| 5,617,768 | A | * | 4/1997 | Palazzolo ....................... 82/47 |
| 6,401,587 | B1 | * | 6/2002 | Beltrandi ...................... 83/879 |
| 6,619,946 | B1 | * | 9/2003 | Marshall et al. .......... 425/305.1 |

* cited by examiner

Primary Examiner—Allan N. Shoap
Assistant Examiner—Ghassem Alie
(74) Attorney, Agent, or Firm—Robert H. Bachman (57) ABSTRACT

Method and apparatus for trimming a container having an open end wherein the container is held during the trimming operation, including a multi-station assembly for holding the container to be trimmed stationary during trimming, ejecting the trimmed portion and ejecting the trimmed container.

18 Claims, 11 Drawing Sheets

METHOD AND APPARATUS FOR TRIMMING CONTAINERS

BACKGROUND OF THE INVENTION

The present invention relates to a method and apparatus for trimming containers, particularly blow molded containers, in a multi-station operation, preferably at a high speed.

In certain applications it is desirable to provide trimming of the formed container to remove a scrap piece. This is particularly true in blow molding applications. Most often, this has been done on extruded blow molded containers to remove blow heads and to provide dispensing openings that usually have a thread or other retainer for securing a closure cap thereon. Such trimmings are disclosed, for example, by U.S. Pat. Nos. 5,167,968 to Dunlap et al. and 6,367,360 to Dunlap et al., both of which are assigned to the assignee of the present application.

It would be highly desirable to provide a high speed trimming method and apparatus that is convenient and expeditious to employ, and it is a principal objective of the present invention to provide such a method and apparatus.

Further objects and advantages of the present invention will appear hereinbelow.

SUMMARY OF THE INVENTION

In accordance with the present invention a method and apparatus is provided for trimming a plastic container having an open end, wherein the container is held stationary during the trimming operation.

In accordance with the method of the present invention a multi-station assembly is provided having spaced stations which hold the container to be trimmed during the trimming operation. The method includes: moving the container to be trimmed onto the multi-station assembly at a first operating stage; moving a knife into engagement with the container to be trimmed at a second operating stage; trimming said container at a third operating stage by said knife, with the container held stationary during trimming; ejecting the trimmed portion at a fourth operating stage; and ejecting the trimmed container at a fifth operating stage; wherein said container traverses stations of said multi-station assembly for said stages. Separate stages should be performed in the area of separate stations, but a stage may occupy more than one station in the multi-station assembly. For example, the trimming operation desirably occupies several stations.

The present invention also includes an apparatus for trimming a plastic container having an open end. In accordance with the apparatus of the present invention a multi-station assembly is provided having spaced stations which hold a container during trimming, including inlet means to move the container to be trimmed onto said assembly at a first operating stage, a knife operative to trim said container, means to move the knife into engagement with the container to be trimmed at a second operating stage, means to move said knife around said container to be trimmed to trim said container at a third operating stage, means to hold the container stationary during trimming, means to eject the trimmed portion at a fourth operating stage, and means to eject the trimmed container at a fifth operating stage, wherein said container traverses stations of said multi-station assembly for said stages.

The present invention also includes an intermediate plastic container for trimming into a final, trimmed container.

Further features of the present invention will appear hereinbelow.

BRIEF DESCRIPTION OF THE DRAWINGS

The present invention will be more readily understandable from the illustrative, accompanying drawings, wherein.

DETAILED DESCRIPTION OF PREFERRED EMBODIMENTS

In the preferred embodiment of the present invention a blow molded plastic container is provided for trimming in accordance with the present invention. The container is preferably of the type made from an injection molded preform having an open end with a portion adjacent the open end which requires trimming. The container may be round or non-round and is desirably held in a stationary position generally adjacent the portion requiring trimming during the trimming operation. The neck finish portion of the final container may be a threaded or snap-on finish, and any plastic material can be used, preferably polyethylene terephthalate. Advantageously, the process and apparatus of the present invention is capable of high speed operation, for example, in accordance with the present invention one may achieve a trimming rate of at least 5,000 containers per hour and may trim non-round containers at a rate of about 10,000 bottles per hour and round containers at a rate of about 15,000 bottles per hour.

Figure 1:
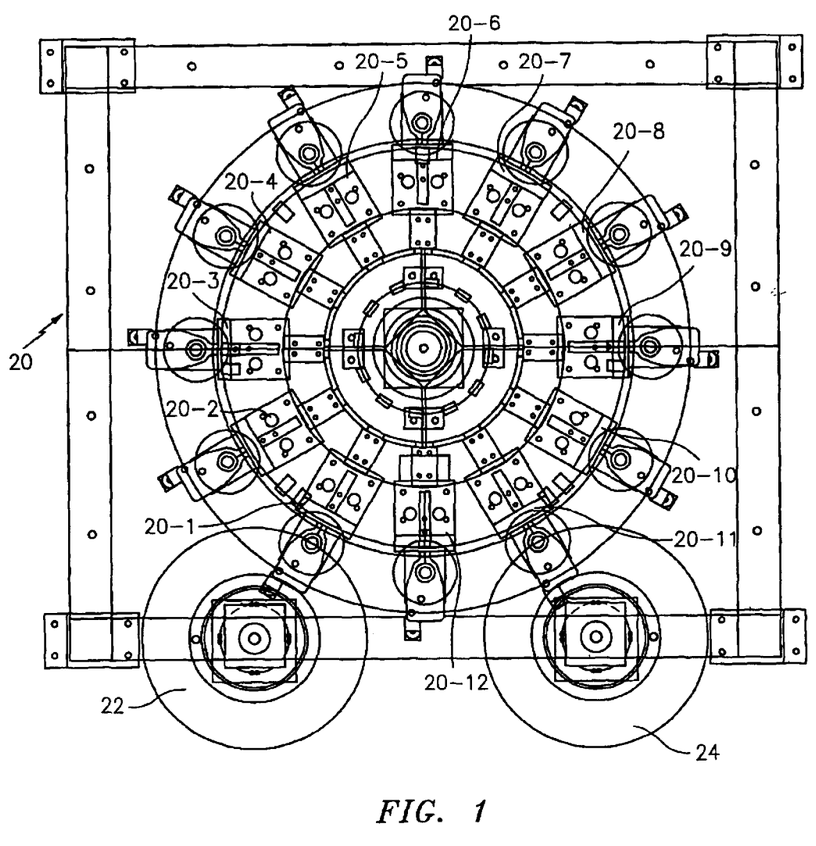
FIG. 1 is a partially schematic view illustrating the multi-station assembly of the present invention.

FIG. 1 shows an exemplificative multi-station assembly 20 of the present invention including twelve spaced operating stations 20-1 through 20-4 12, with a first inlet station 20-1 and a final station 20-12. Naturally, the number of stations may vary.

The container to be trimmed 26 enters the multi-station assembly at inlet station 20-1, as by inlet wheel 22 which may hold several containers and deposits same sequentially at the inlet station. The completed, trimmed container is ejected at outlet station 20-4 11 as onto outlet wheel 24. Final station 20-12 is located between the inlet and outlet stations and provides an in-between station for examination of components. The remaining operations are conducted at the remaining stations and will be described below.

Figure 2:
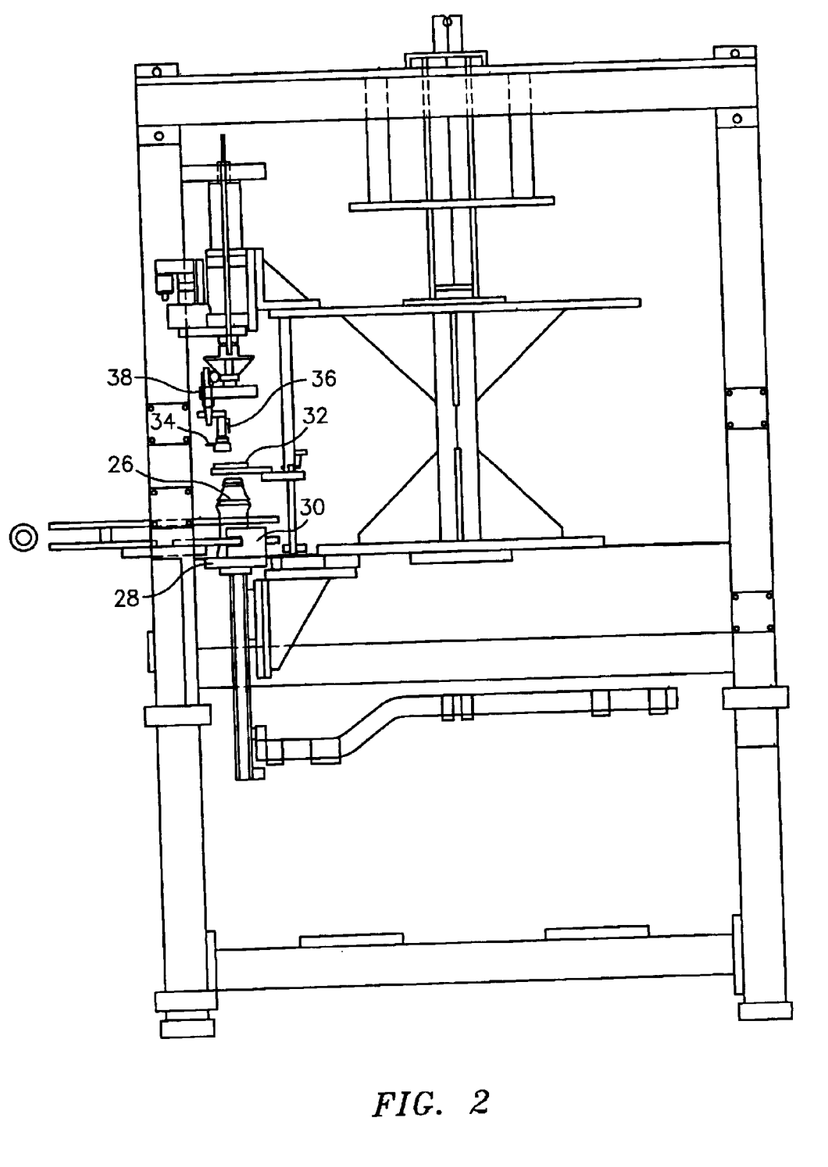
FIG. 2 is a detail view of a container to be trimmed moved into the multi-station assembly.
Figure 3:
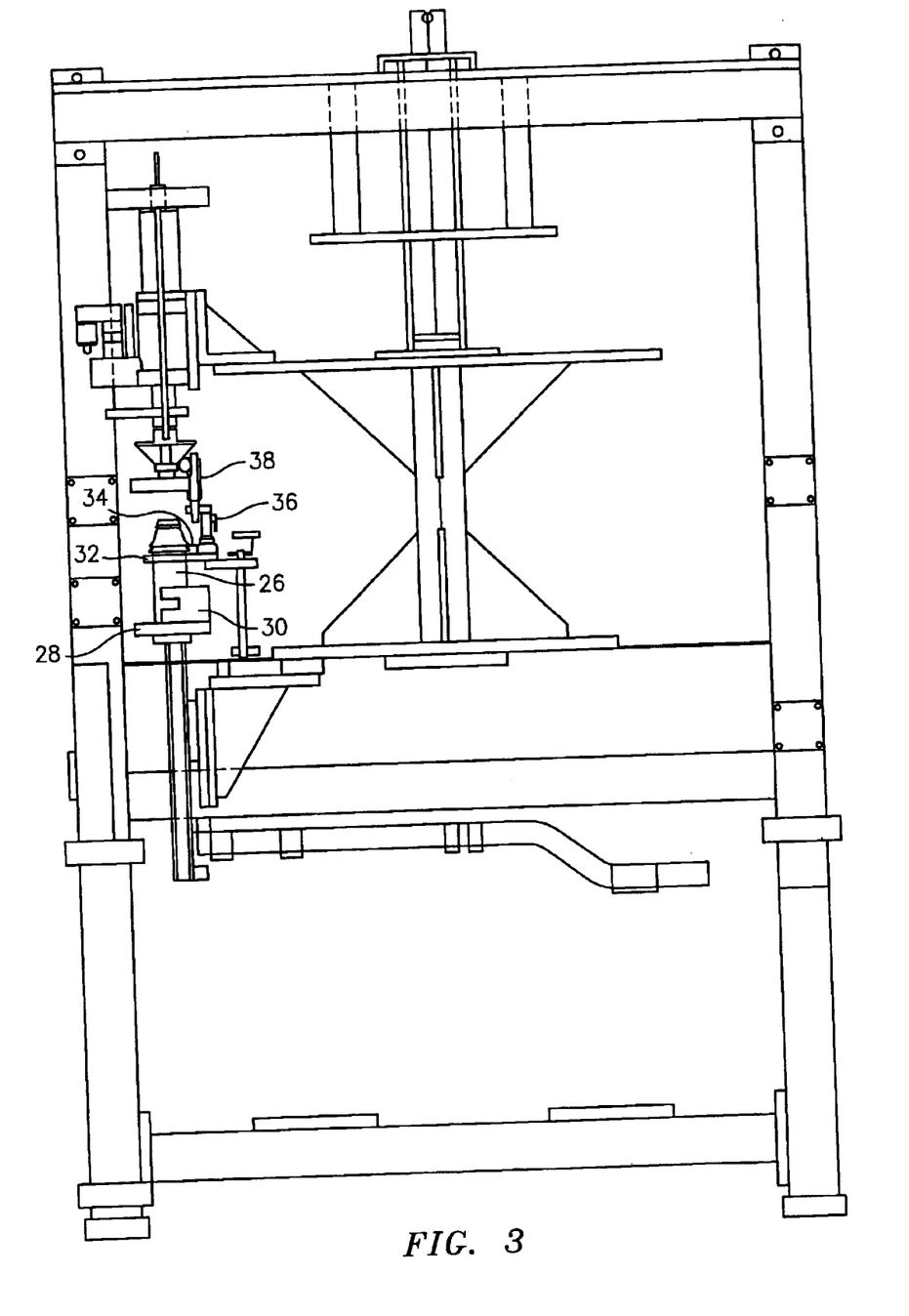
FIG. 3 is a detail view of a container being lifted into a neck holder.

FIG. 2 shows a detail view of a container to be trimmed 26 moved into station 20-1 of multi-station assembly 20 at a first stage of the operation. The container 26 is held on a pedestal 28 by waist band 30 with neck holder 32 in position above the container. Knife 34, knife actuating arm 36 and trimmer head 38 are also positioned above container 26. Between the first station 20-1 and the second station 20-2 pedestal 28 raises and lifts container 26 into trimming position at the second station as shown in FIG. 3, and from the second station 20-2 to the third station 20-3 knife actuating arm 36 moves knife 34 into trimming position at a second stage of the operation and into engagement with the container while neck holder 32 firmly engages and holds container 26 beneath the area to be trimmed at the third station, as also shown in FIG. 3.

Figure 4:
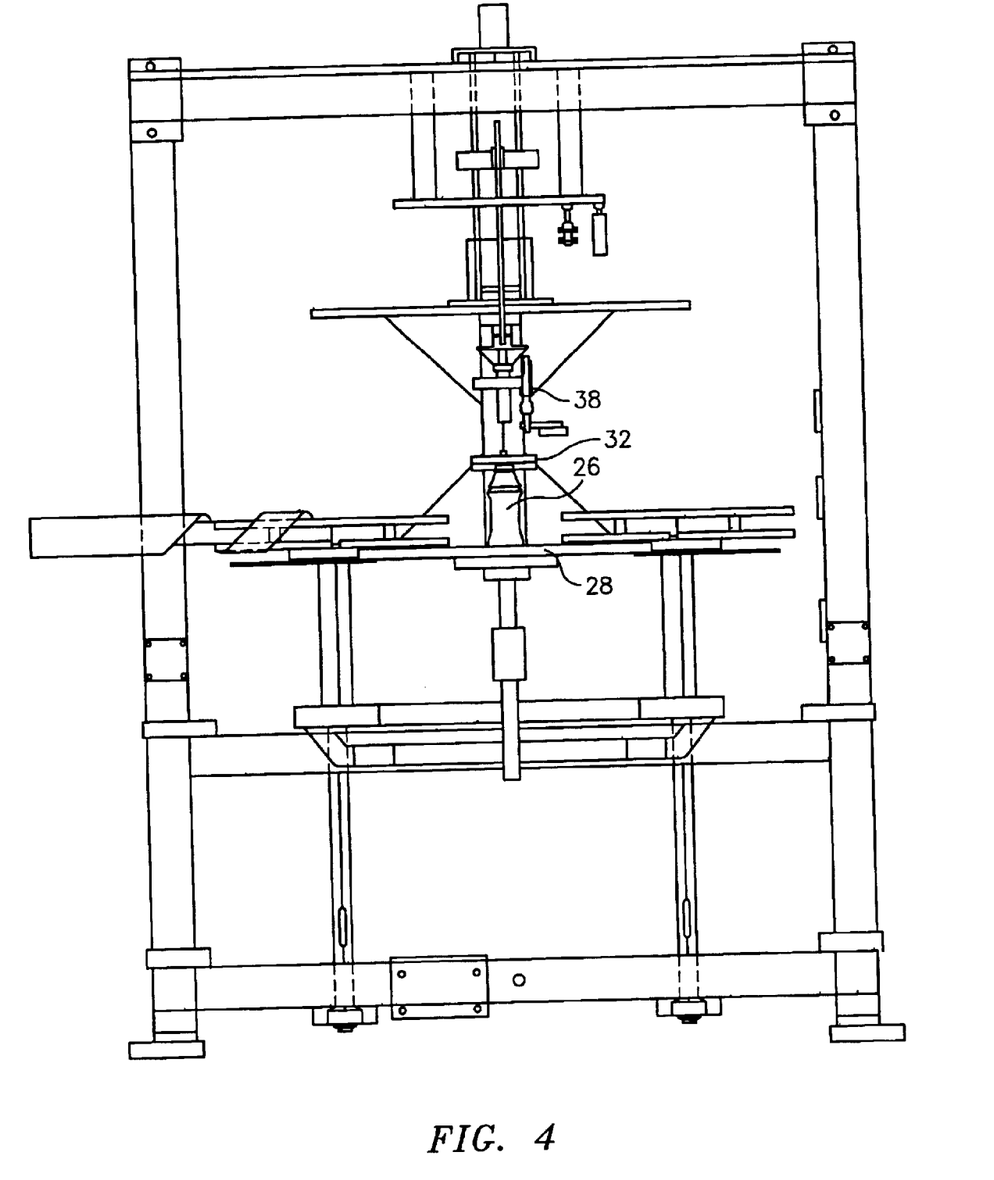
FIG. 4 is a further detail view of a container being lifted into a neck holder.
Figure 5:
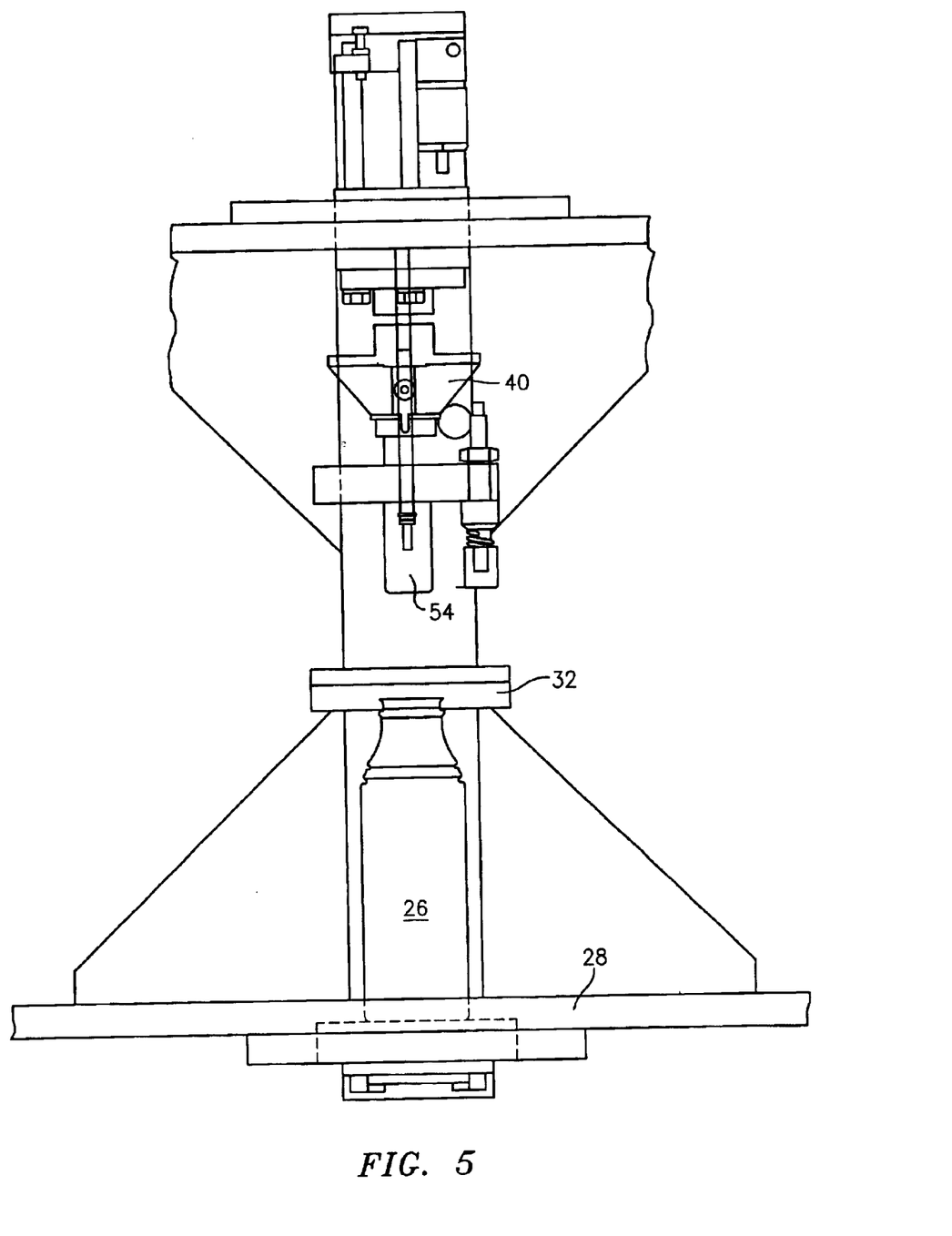
FIG. 5 is an enlarged, detail view of a container on a pedestal being lifted into a neck holder.
Figure 6:
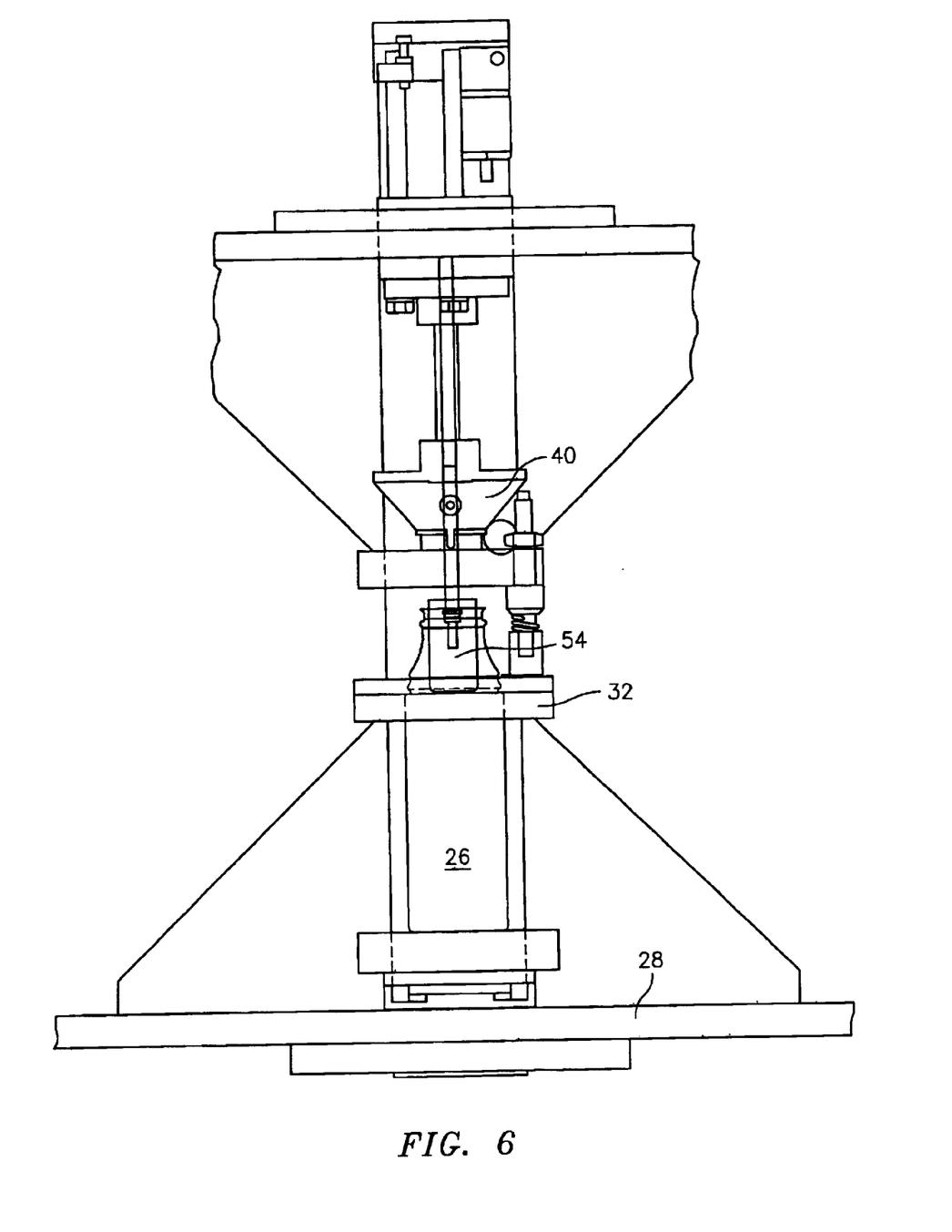
FIG. 6 is an enlarged, detail view similar to FIG. 5 of a container raised into the neck holder.
Figure 7:
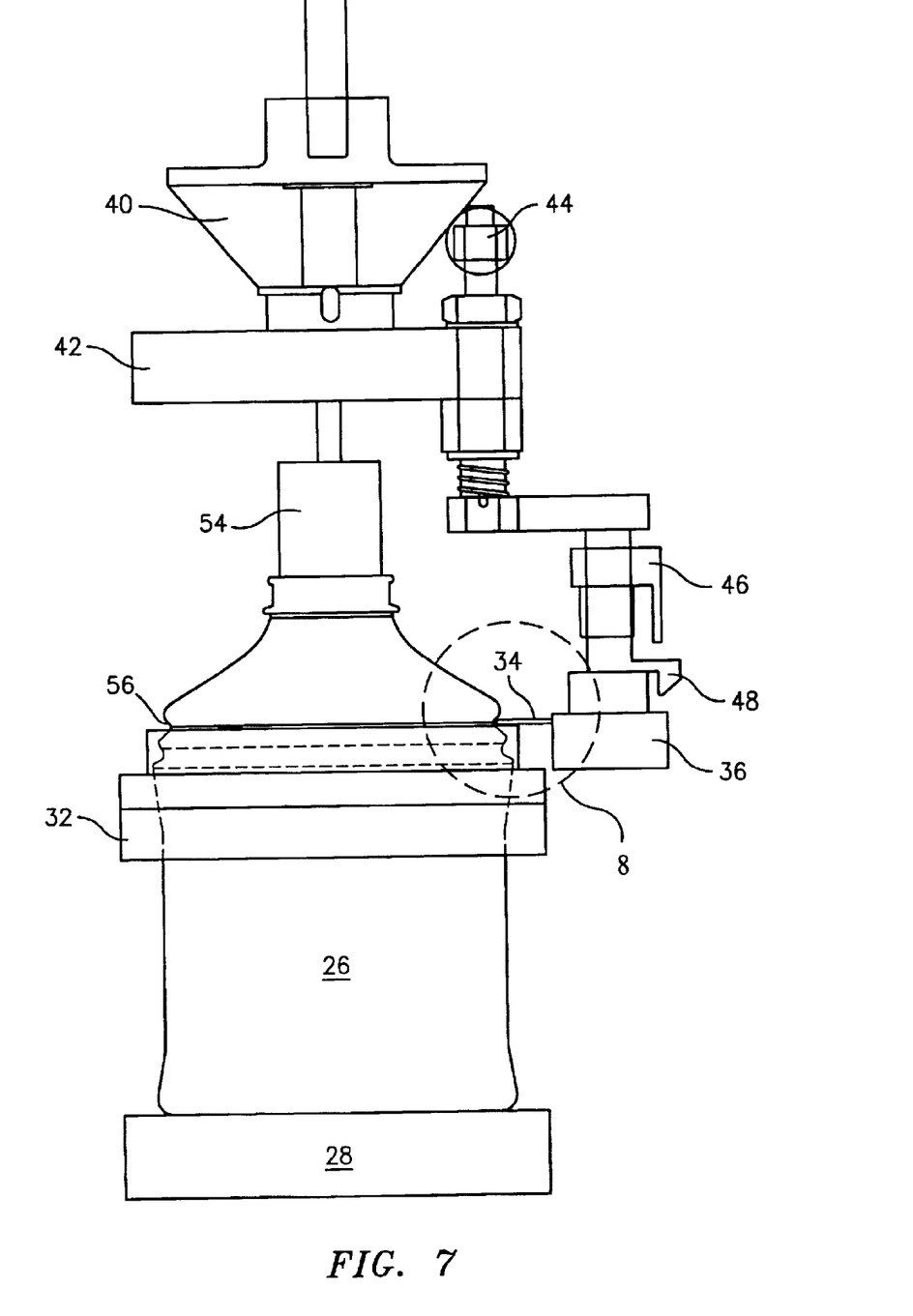
FIG. 7 is an enlarged, detail view of a container raised into the neck holder with the knife in trimming position.
Figure 8:
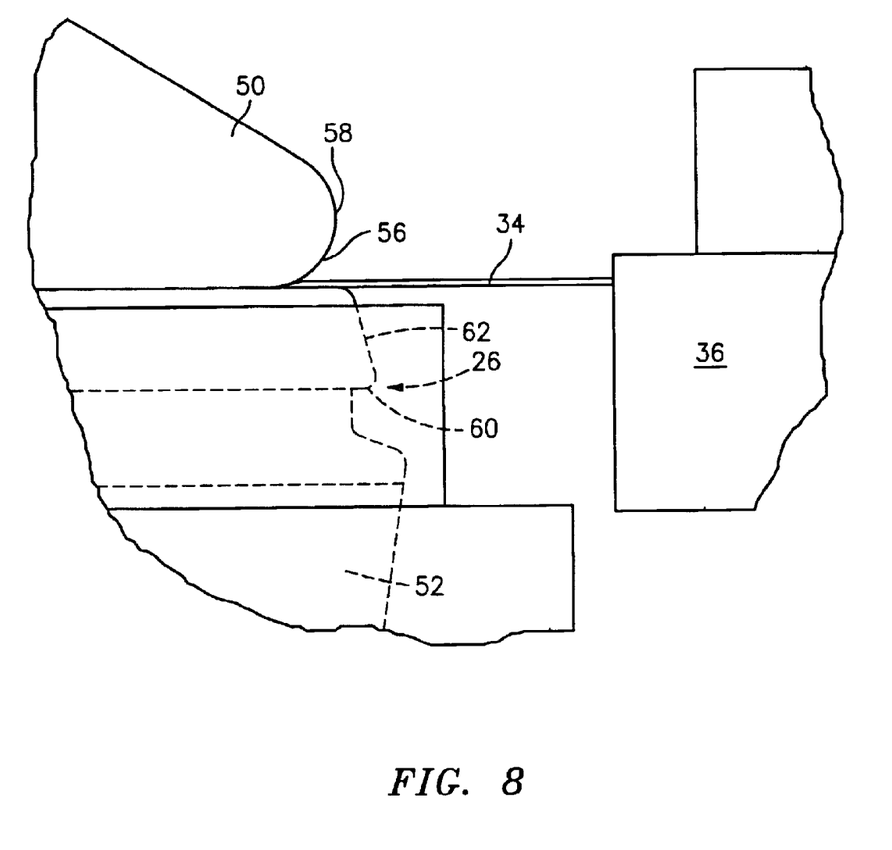
FIG. 8 is an enlarged view of portion 8 from FIG. 7 showing the knife engagement with the container.

FIGS. 4–5 are further detail views of container 26 being lifted by pedestal 28, and FIG. 6 is a further detail view of the container 26 raised into the neck holder 32. FIG. 7 is an enlarged view of the container 26 raised by pedestal 28 into neck holder 32 with the neck holder firmly holding the container beneath the area to be trimmed 56 and with knife 34 engaged with the container in trimming position in the second stage. FIG. 8 is an enlarged view of portion 8 from FIG. 7 showing knife 34 in engagement with container 26 for trimming. FIG. 8 clearly shows the portion of container 26 to be trimmed 50 and the portion remaining after trimming which is the trimmed container 52. FIG. 7 also clearly shows rotary cam 40, cutter components mounting plate 42, roller 44 for moving knife 34, spring tensioner 46, roller mount stop 48 and knife actuating arm 36, all for camming, positioning and moving knife 34 in the trimming operation, wherein the knife is moved around the container to trim the container at the area to be trimmed 56. Knife actuating arm 36 is moved downward and cam 40 engages knife 34 with container 26. The trimming operation takes place in the third stage of operation n and desirably occurs over several stations. For example, in the preferred embodiment the trimming operation starts at the station 20-3 and continues to the station 20-8. The container is desirably held stationary on pedestal 28 by neck holder 32 during the trimming operation while knife 34 is rotated around container 26 during the trimming operation by cam 40, roller 44 and knife actuating arm 36.

As clearly shown in FIG. 8, for example, the outer diameter 58 of the portion to be trimmed 50 is no greater than and is desirably smaller than the outer diameter 60 of the finish portion 62 of the trimmed container 52, which in this embodiment is a snap-on finish, although a screw-threaded finish may also be used. The desirably smaller outer diameter of the portion to be trimmed is advantageous as less plastic material can be used in the portion to be trimmed 50, which may be a throw-away component. Also, this enables one to better control the thickness at the top of the trimmed container 52 and finish portion 62. This also facilitates controlled material distribution in the finish area to enable an even distribution of wall thickness in the finish area to enhance finish effectiveness and trimming effectiveness, especially in a non-round container. In addition, the desirably smaller outer diameter 58 of the portion to be trimmed 50 facilitates making the finish area thicker in the final, trimmed container. It also facilitates blow out in the blow molding procedure for snap beads in a snap on finish or threaded areas for a threaded finish.

Figure 9:
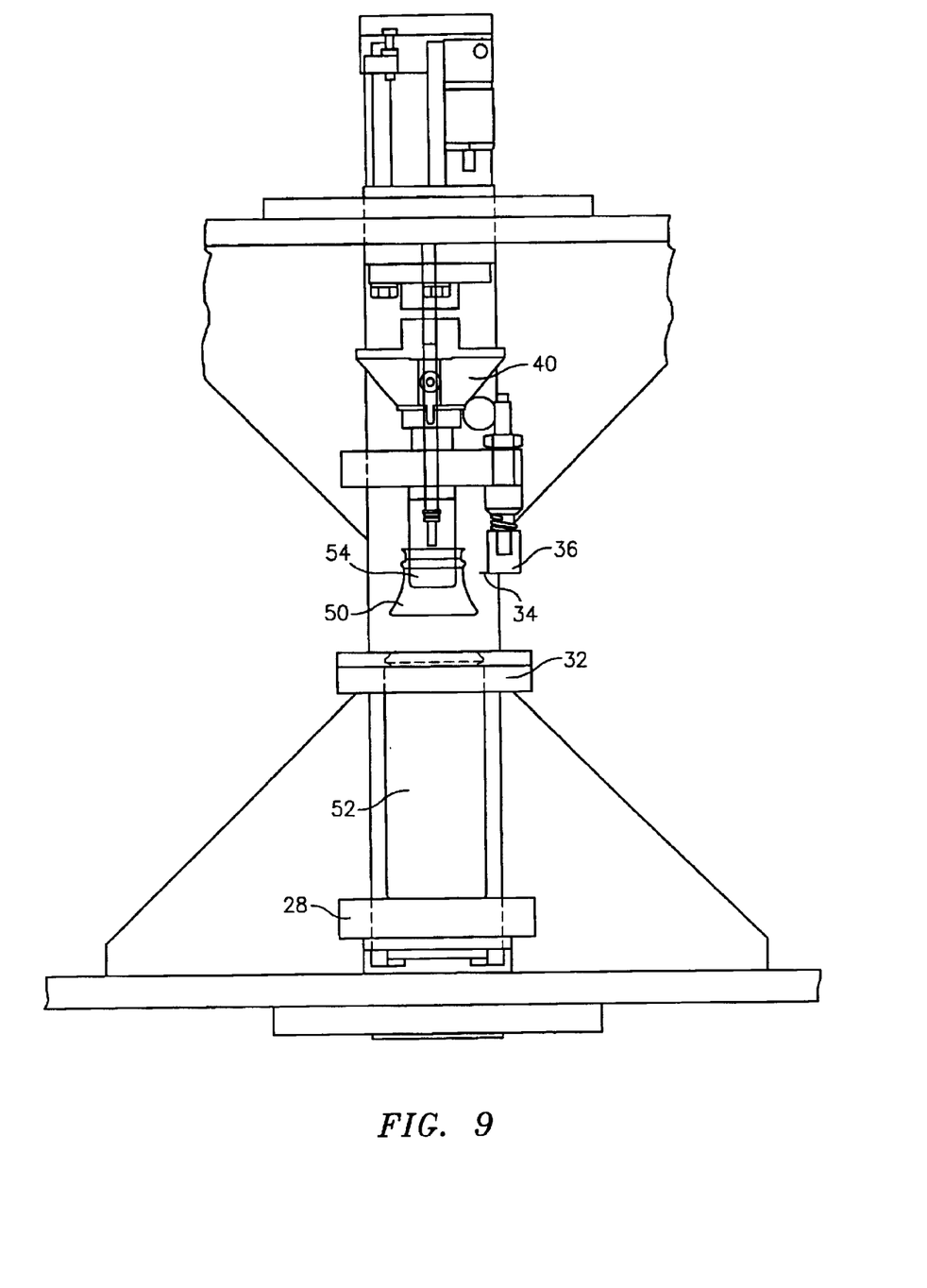
FIG. 9 is an enlarged, detail view of the trimmed container separated from the trimmed portion.
Figure 10:
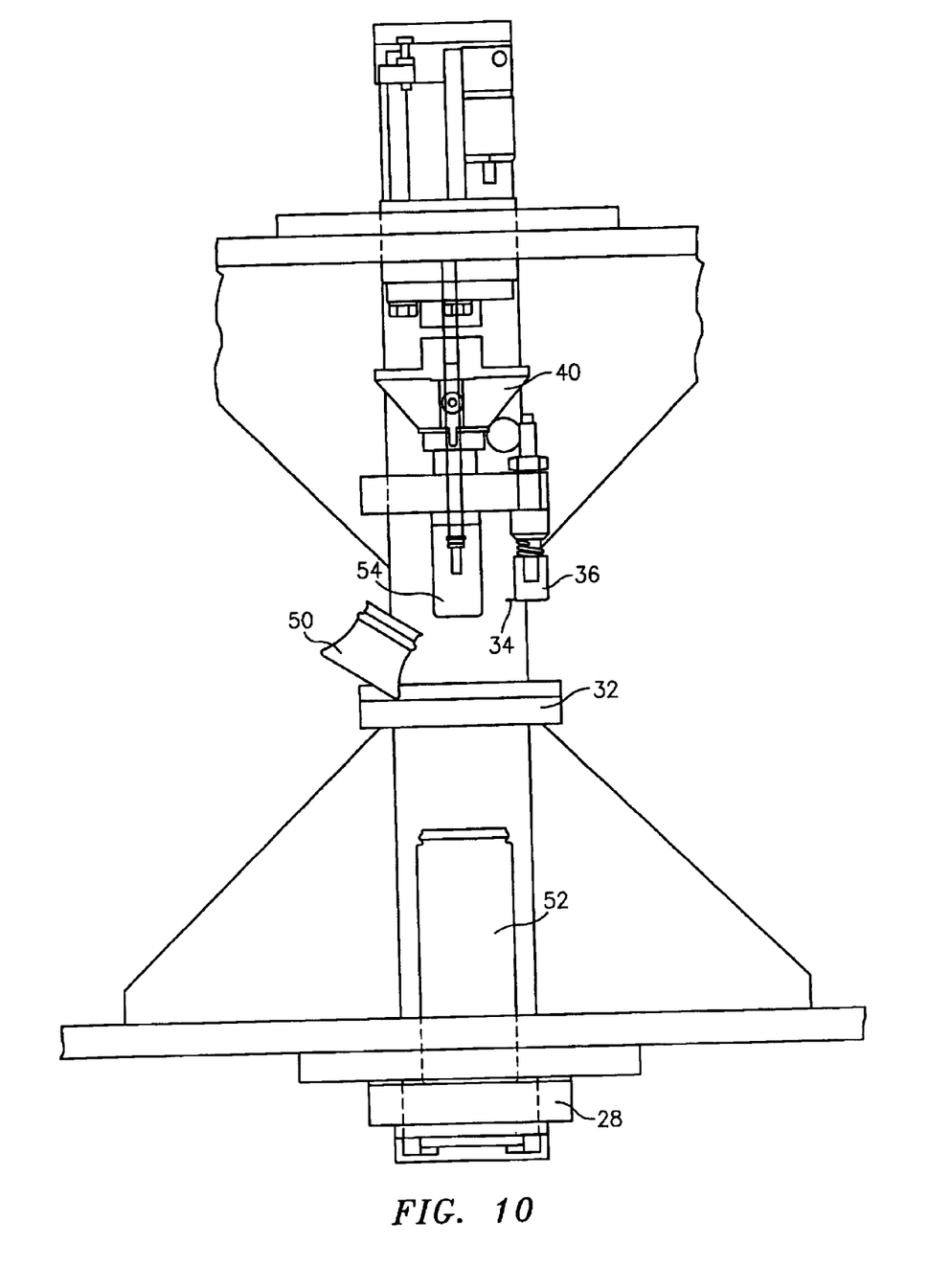
FIG. 10 is an enlarged, detail view showing the trimmed portion being ejected.

Between stations 20-8 and 20-9 the trimming operation has stopped and the knife 34 and knife actuating arm 36 are raised and trimmed portion 50 separated from trimmed container 52. The trimmed portion 50 is moved away from trimmed container 52 by arm 54 while the trimmed container 52 is held on pedestal 28 by neck holder 32 as shown in FIG. 9. This takes place between stations 20-8 and 20-9. The trimmed portion 50 is removed, as by air blowing, as for example at station 20-9 at the fourth stage of the operation as shown in FIG. 10.

Between the stations 20-9 and 20-10 the pedestal 28 drops down to starting position and at station 20-11 the trimmed container 52 is removed as shown in FIG. 1 as on outlet wheel 24 at the fifth stage of the operation.

Figure 11:
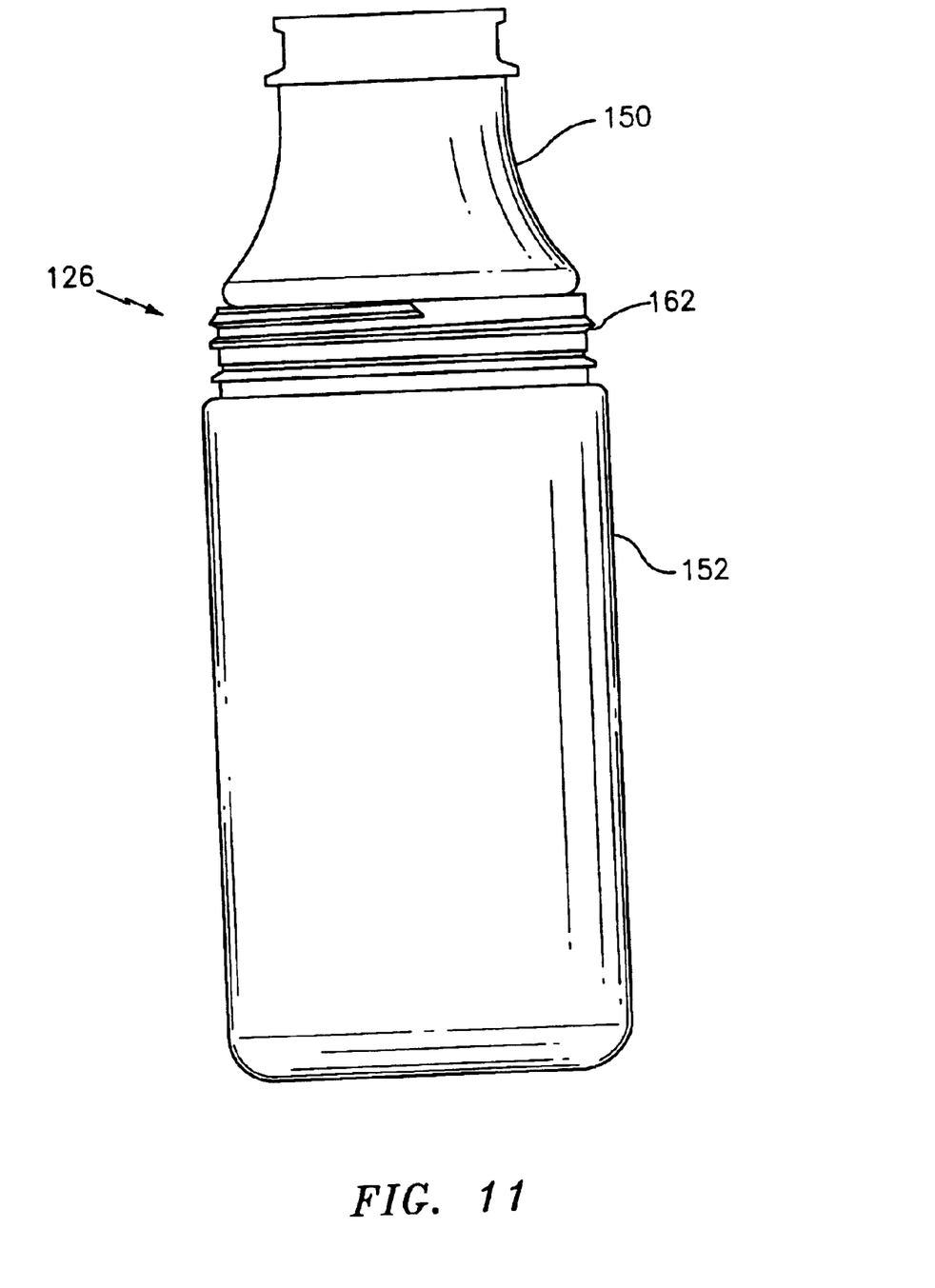
FIG. 11 is a side view of an intermediate plastic container with a threaded finish portion.

FIG. 11 shows an alternate embodiment of intermediate container to be trimmed 126, with upper portion to be trimmed 150, lower portion remaining after trimming 152, and intermediate finish portion 162 which in this embodiment is a threaded finish. Here again, the outer diameter of the upper portion is no greater than the outer diameter of the finish portion.

Thus the process and apparatus of the present invention simply and expeditiously obtain a high speed operation and is usable for round and non-round containers. The same number of stations can be used for both round and non-round containers, and the exact number of stations is not critical. The knife rotates at a controlled speed while the container to be trimmed, round or non-round alike, is held stationary. This avoids bottle movement and allows for a highly accurate trimming operation capable of trimming at least 5,000 containers per hour. Mechanical air values are preferably used to move the knife down and into engagement with the container to be trimmed.

The container to be trimmed of the present invention, with the finish area at an intermediate portion on the container, enables one to provide a heat set finish area in the final, trimmed container, wherein the finish area in the final, trimmed container can advantageously resist hot filling. The even distribution of plastic in the finish area on a non-round container is particularly suitable for a heat set finish.

Stationary trimming, when the container is stationary during the trimming operation, facilitates trimming containers with slight irregularities on round, non-round and offset container openings, and on both round or non-round containers with screw thread or snap on finish areas. This enables one to readily provide exotic opening shapes, as for example, triangular openings, offset oval openings, tear shaped openings, or figure eight shaped openings. Further, trimming of round or non-round containers in accordance with the present invention as well as offset neck areas allows packaging efficiencies, for example, square or rectangular packages can be readily obtained as well as packages with offset round openings.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for trimming a plastic container having open end and a base, which comprises: providing a multi-station assembly for holding a container during trimming, wherein said assembly includes a plurality of spaced stations and wherein said container traverses stations of said multi-station assembly for operating stages; moving the container to be trimmed onto said multi-station assembly at a first operating stage; moving a knife by a knife actuating arm into engagement with the container to be trimed at a second operation stage; trimming said container by said knife at a third operating stage, with said container held stationary during trimming and with the knife moving around the container at the area to be trimmed; ejecting the trimmed portion at a fourth operating stage; and ejecting the trimmed container at a fifth operating stage; wherein the base of the container is supported during its traverse through the multistation assembly, and the container is also held by a holder beneath the area to be trimmed to hold the container stationary during trimming, including camming, positioning and moving the knife and knife actuating arm by moving a roller on a tapered cam.

2. A method according to claim 1 wherein said container to be trimmed is a blow molded container.

3. A method according to claim 1, wherein the trimming operation in the second stage occupies a plurality of stations.

4. A method according to claim 1, wherein separate stages are performed in the area of separate stations.

5. A method according to claim 1, wherein the upper portion of the trimmed container has a finish portion, and wherein the outer diameter of the trimmed portion is no greater than the outer diameter of the finish portion.

6. A method according to claim 1, wherein said method is a high speed operation for trimming at least 5,000 containers per hour.

7. A method according to claim 6, including trimming at least 10,000 containers per hour.

8. A method according to claim 1, wherein the container is held on a pedestal during its traverse through the multistation assembly.

9. A method according to claim 1, wherein the knife is cammed into engagement with the container to be trimmed.

10. A method according to claim 1, including an inlet wheel for holding a plurality of containers to be trimmed, and sequentially feeding the containers onto said multistation assembly from said inlet wheel.

11. A method according to claim 10, wherein the trimmed containers are ejected onto an outlet wheel.

12. A method according to claim 8, wherein the container is raised into the holder by the pedestal.

13. A method according to claim 12, including the step of lifting the container into trimming position by raising the pedestal.

14. A method according to claim 1, including the step of separating the trimmed portion from the trimmed container after the trimming operation and before ejecting the trimmed portion.

15. A method according to claim 13, including the step of lowering the pedestal to a starting position after the trimming operation.

16. A method according to claim 1, including moving the knife on a mounting plate and spring tensioner connected to the roller, wherein the spring tensioner is spaced from the axis of the tapered cam.

17. A method according to claim 1, including moving the knife actuating arm downward and engaging the knife with the container to be trimmed by moving the roller on the cam.

18. A method according to claim 1, including rotating the knife around the container during trimming by the cam, roller and knife actuating arm.

* * * * *